United States Patent
Yanai (10) Patent No.: US 6,618,364 B2
(45) Date of Patent: *Sep. 9, 2003

(54) FRAME OFFSET SETTING ARRANGEMENT AND FRAME OFFSET SETTING METHOD

(75) Inventor: Yukinori Yanai, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/296,238

(22) Filed: Apr. 22, 1999

(65) Prior Publication Data

US 2003/0117975 A1 Jun. 26, 2003

(30) Foreign Application Priority Data

Apr. 22, 1998 (JP) .......................................... 10-111242

(51) Int. Cl.[7] ............................................... H04B 7/26
(52) U.S. Cl. ...................... 370/331; 370/335; 370/441; 455/436
(58) Field of Search ............................... 370/331, 342, 370/350, 335, 310, 328, 329, 431, 433, 441, 458; 455/436

(56) References Cited

U.S. PATENT DOCUMENTS

| | | | | | |
|---|---|---|---|---|---|
| 5,228,029 | A | * | 7/1993 | Kotzin ........................ | 370/331 |
| 5,363,404 | A | * | 11/1994 | Kotzin et al. ................ | 370/335 |
| 5,568,472 | A | | 10/1996 | Umeda et al. ................. | 370/18 |
| 5,640,679 | A | * | 6/1997 | Lundqvist et al. ........... | 370/331 |
| 5,920,551 | A | | 7/1999 | Na et al. ....................... | 370/335 |
| 5,959,981 | A | * | 9/1999 | Bruckert et al. .............. | 370/331 |
| 6,058,136 | A | | 5/2000 | Ganesh et al. ................. | 375/130 |
| 6,122,264 | A | * | 9/2000 | Kaufman et al. ............. | 370/331 |
| 6,154,453 | A | * | 11/2000 | Kim et al. ..................... | 370/335 |
| 6,359,876 | B1 | * | 3/2002 | Kamata ........................ | 370/335 |
| 6,456,606 | B1 | * | 9/2002 | Terasawa ...................... | 370/331 |

FOREIGN PATENT DOCUMENTS

| | | |
|---|---|---|
| EP | 0961444 A1 | 1/1999 |
| EP | 0907263 A2 | 4/1999 |
| JP | 6-197097 | 7/1994 |
| JP | 7-297753 | 11/1995 |
| JP | 8-340311 | 12/1996 |
| JP | 9-18448 | 1/1997 |
| JP | 9-261763 | 10/1997 |
| JP | 10-276464 | 10/1998 |
| JP | 11-112385 | 1/1999 |
| KR | 96-7662 B1 | 6/1996 |
| WO | WO 98/44669 A1 | 10/1998 |

OTHER PUBLICATIONS

Yang et al. "PN Offset Planning in IS–95 Based CDMA Systems". IEEE Vehicular Technology Conference. May 4–7, 1997. pp. 1435–1439.*

* cited by examiner

Primary Examiner—Melvin Marcelo
Assistant Examiner—Derrick W Ferris
(74) Attorney, Agent, or Firm—Foley & Lardner (57) ABSTRACT

In a frame offset setting arrangement which is arranged in a base station of a code division multiple access system for setting frame offset values in mobile units by informing the frame offset values to the mobile units, a concentration detecting part (110, 111) detects concentration in distribution of the frame offset values set in the mobile units. The frame offset values represent amounts of offsetting, from a leading edge of each frame, transmission timings of speech packets when the mobile units transmit the speech packets to the base station, respectively. A leveling part (112–121) levels, when the concentration detecting part detects the concentration, the frame offset values for the mobile units which are currently on communication. Specifically, the number of the mobile units using each frame offset value is counted. With reference to counted values, new frame offset values are selected to thereby cancel the concentration.

22 Claims, 7 Drawing Sheets

FRAME OFFSET SETTING ARRANGEMENT AND FRAME OFFSET SETTING METHOD

BACKGROUND OF THE INVENTION

This invention relates to a frame offset setting arrangement and a frame offset setting method for use in a mobile communication system and, in particular, to a frame offset setting arrangement and a frame offset setting method for reducing a processing delay resulting from concentration of speech packets on a base station control unit at a same time instant or slot.

In a CDMA (Code Division Multiple Access) system defined by a communication standard IS-95 recommended by the U.S. TIA (Telecommunications Industry Association), a frame offset value is informed from a base station (more specifically, a base station control unit of the base station) to a mobile unit upon call connection. Assuming that each frame has a unit time of 20 ms, the frame offset value represents one of 0-th through 15-th positions determined by dividing the unit time of 20 ms into 16 equal parts. Typically, the frame offset value indicates one of integers 0 through 15 to represent the 0-th through the 15-th positions, respectively. The 0-th through the 15-th positions are offset by 1.25 ms from one another. Informed of the frame offset value, the mobile unit shifts a transmission timing of a speech packet from a leading edge of each frame by (the frame offset value×1.25 ms). The frame offset value is determined by the base station control unit so that the speech packets are not temporarily concentrated on a transmission path between a base station radio unit of the base station and the base station control unit.

It is assumed here that speech packets are simultaneously supplied from all mobile units connected to a particular base station. In this event, a processing delay is caused to occur when the speech packets are inserted into the transmission path. In other words, the processing delay occurs when the speech packets from the mobile units are made to pass through the transmission path between the base station radio unit and the base station control unit. In this case, the processing delay can be reduced if the transmission timings of the speech packets are shifted by the mobile units which are informed of the frame offset values different from each other as described above. In this manner, it is possible to reduce the processing delay upon insertion of the speech packets from the base station radio unit to the transmission path.

In the base station control unit of the above-mentioned prior art, the speech packets from a plurality of base station radio units are converted from QCELP (Qualcomm Codebook Excited Linear Production) as a radio zone modulation system into PCM as a network modulation system. In this event, a processing delay may possibly be produced because a number of speech packets to be simultaneously converted are received by the base station control unit depending upon the distribution of the frame offset values determined by the base stations.

Specifically, in the above-mentioned prior art, it is assumed that a particular mobile unit moves from an area of a particular base station radio unit to a different area of a different base station radio unit by handover (changing a communication channel). In this event, a particular frame offset value before the handover is used without being changed. Therefore, in the different base station radio unit in the different area, the particular frame offset value for the particular mobile unit subjected to handover may coincide with the same frame offset value used for other mobile units within the different areas so that this frame offset value is concentratedly used. In this event, the speech packets to be converted are concentrated. This results in occurrence of the processing delay, speech omission, speech distortion, and data omission.

Generally, the frame offset value are not concentratedly used because they are determined at random. However, in case of the above-mentioned handover or if calls of a long speech period concentrate on a specific frame offset value, concentrated use will occur.

Figure 1:
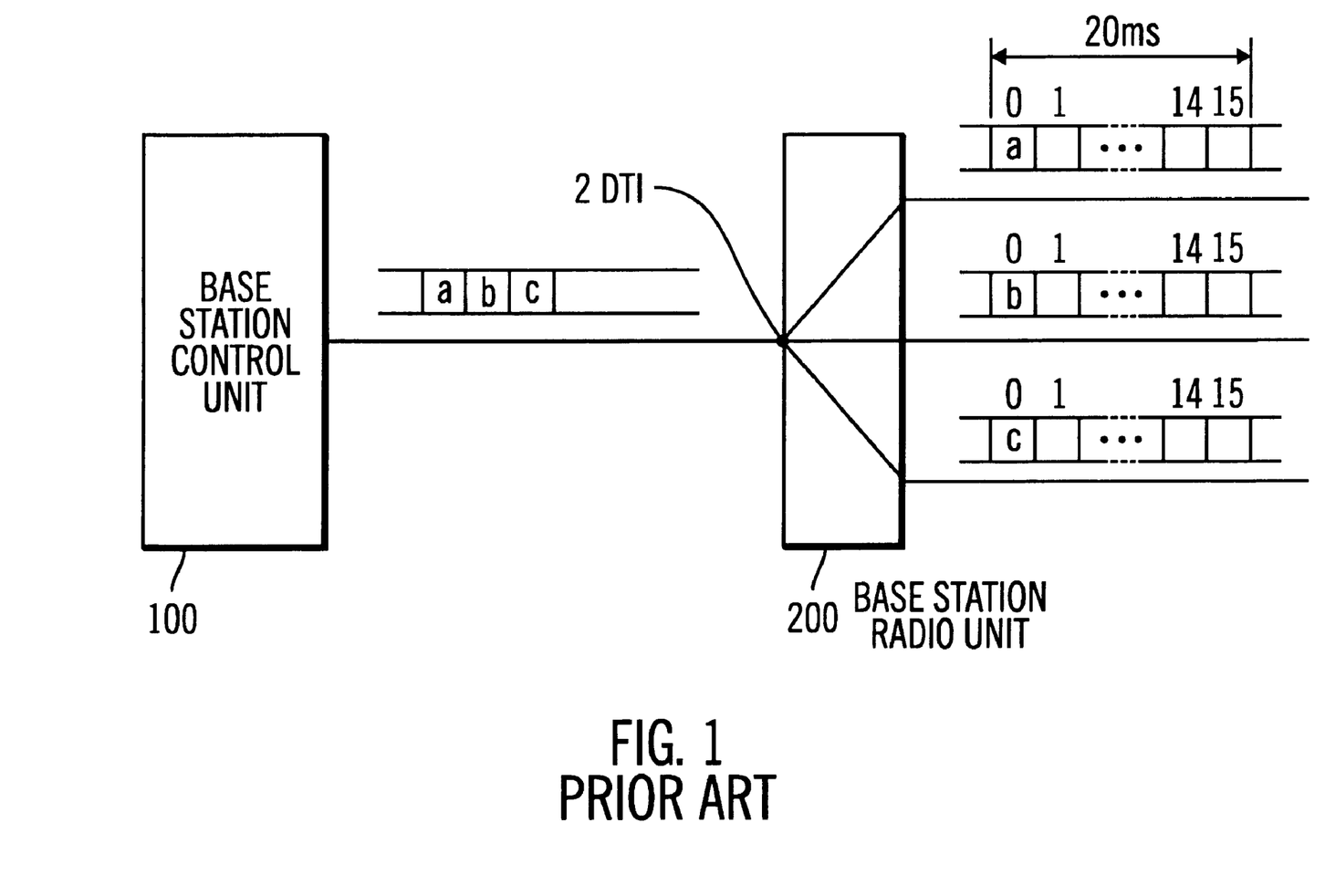
FIG. 1 is a view showing an example of a processing delay resulting from biased distribution of frame offset values.

Now, description will be made about an example of the processing delay resulting from the concentrated use of the frame offset values with reference to FIGS. 1 and 2. At first referring to FIG. 1, it is assumed that a plurality of ("3" in the illustrated example) mobile units transmit signals (or speech packets) a, b, and c to a single base station radio unit 200 at the timings specified by the same frame offset value "0". Inasmuch as the signals (or the speech packets) a, b, and c are transmitted by the same frame offset value "0", the base station radio unit 200 transmits to a base station control unit 100 an exchanged frame including the signals (or the speech packets) a, b, and c in the order of the signals (or the speech packets) a, b, and c. Thus, a delay is produced for each of the signals b and c. In this case, such frames are accumulated in a buffer provided in a digital transmission interface DTI 2 of the base station radio unit 200 to cause a signal delay.

Figure 2:
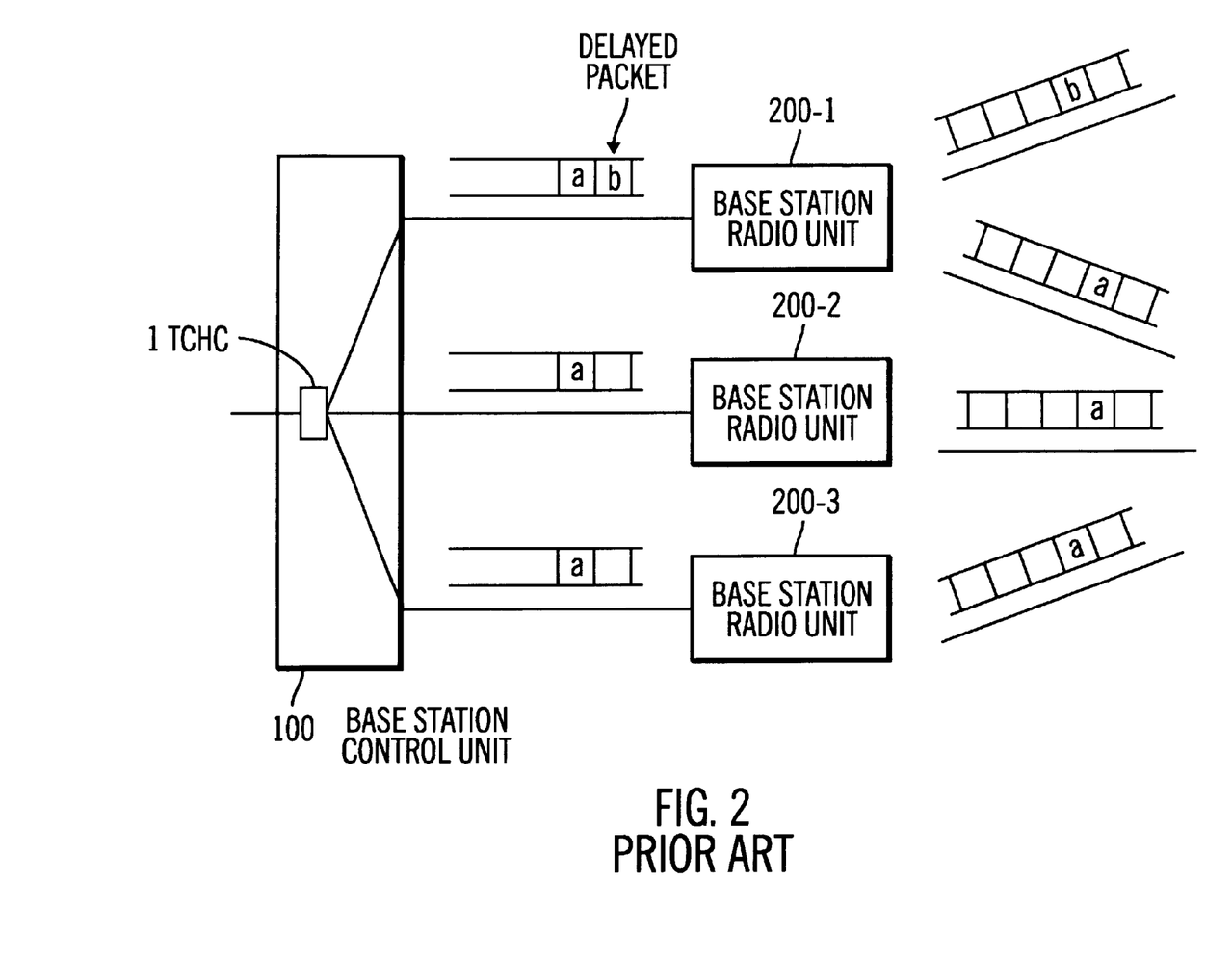
FIG. 2 is a view showing another example of the processing delay.

Next referring to FIG. 2, it is assumed that a traffic channel controller TCHC 1 in the base station radio unit 100 extracts a speech signal of a highest quality among those transmitted from base station radio units 200-1 through 200-3. In this event, a delay is produced if the same offset value is used by a large number of mobile units. Specifically, no problem will arise in each of the base station radio units 200-2 and 200-3 because each of the base station radio units 200-2 and 200-3 does not receive any signals or speech packets which are produced by different mobile units on the basis of the same offset value. On the other hand, the base station radio unit 200-1 receives signals (or speech packets) a and b which are produced by different mobile units on the basis of the same offset value. Therefore, the delay is produced for the signal or packet b.

Japanese Unexamined Patent Publication (JP-A) 6-197097 discloses a technique of giving a transmission timing offset to a signal transmitted from a base station so that each communication can be identified although a same spread code is used. Japanese Unexamined Patent Publication (JP-A) 9-261763 discloses a mobile communication system in which a pilot signal transmitted from each base station is provided with a timing offset specific to the base station so that the mobile unit can reliably identify each base station. However, in these publications, no disclosures is made about the defect due to the concentrated use of the frame offset values. Thus, use of the techniques described in these publications does not remove the above-mentioned disadvantage in the prior art.

SUMMARY OF THE INVENTION

It is an object of this invention to provide a frame offset setting arrangement and a frame offset setting method which are capable of reducing speech omission, speech distortion, and data omission resulting from a processing delay when speech packet are transmitted from a base station radio unit through a base station control unit to an exchange.

A frame offset setting arrangement to which this invention is applicable is arranged in a base station (100, 200-i) of a code division multiple access system for setting frame offset values in mobile units (300-1, 300-2, 300-3) by informing the frame offset values to the mobile units. The frame offset values represent amounts of offsetting, from a leading edge of each frame, transmission timings of speech packets when the mobile unit transmit the speech packets to the base station, respectively.

According to this invention, the frame offset setting arrangement comprises: concentration detecting means (110, 111) for detecting concentration in distribution of the frame offset values set in the mobile units; and leveling means (112–121) for leveling, when the concentration detecting means detects the concentration, the frame offset values for the mobile units which are currently on communication.

A frame offset setting method to which this invention is applicable is carried out in a base station (100, 200-i) of a code division multiple access system for setting frame offset values in mobile units (300-1, 300-2, 300-3) by informing the frame offset values to the mobile units. The frame offset values represent amounts of offsetting, from a leading edge of each frame, transmission timings of speech packets when the mobile units transmit the speech packets to the base station, respectively.

According to this invention, the frame offset setting method comprises: a concentration detecting step (110, 111) of detecting concentration in distribution of the frame offset values set in the mobile units; and a leveling step (112–121) of leveling, when the concentration detecting step detects the concentration, the frame offset values for the mobile units which are currently on communication.

In this invention, the base station monitors and detects the concentration in distribution of the frame offset values. If the concentration is detected, the frame offset values are reset to use different frame offset values. More specifically, the frame offset values currently used are monitored and, if the concentration is detected, calls currently on communication at a current base station is selected to forcedly start handover and reset the frame offset values. In this manner, the concentration in distribution of the frame offset values is cancelled.

DESCRIPTION OF THE PREFERRED EMBODIMENT

Now, description will be made about this invention with reference to the drawing.

Figure 3:
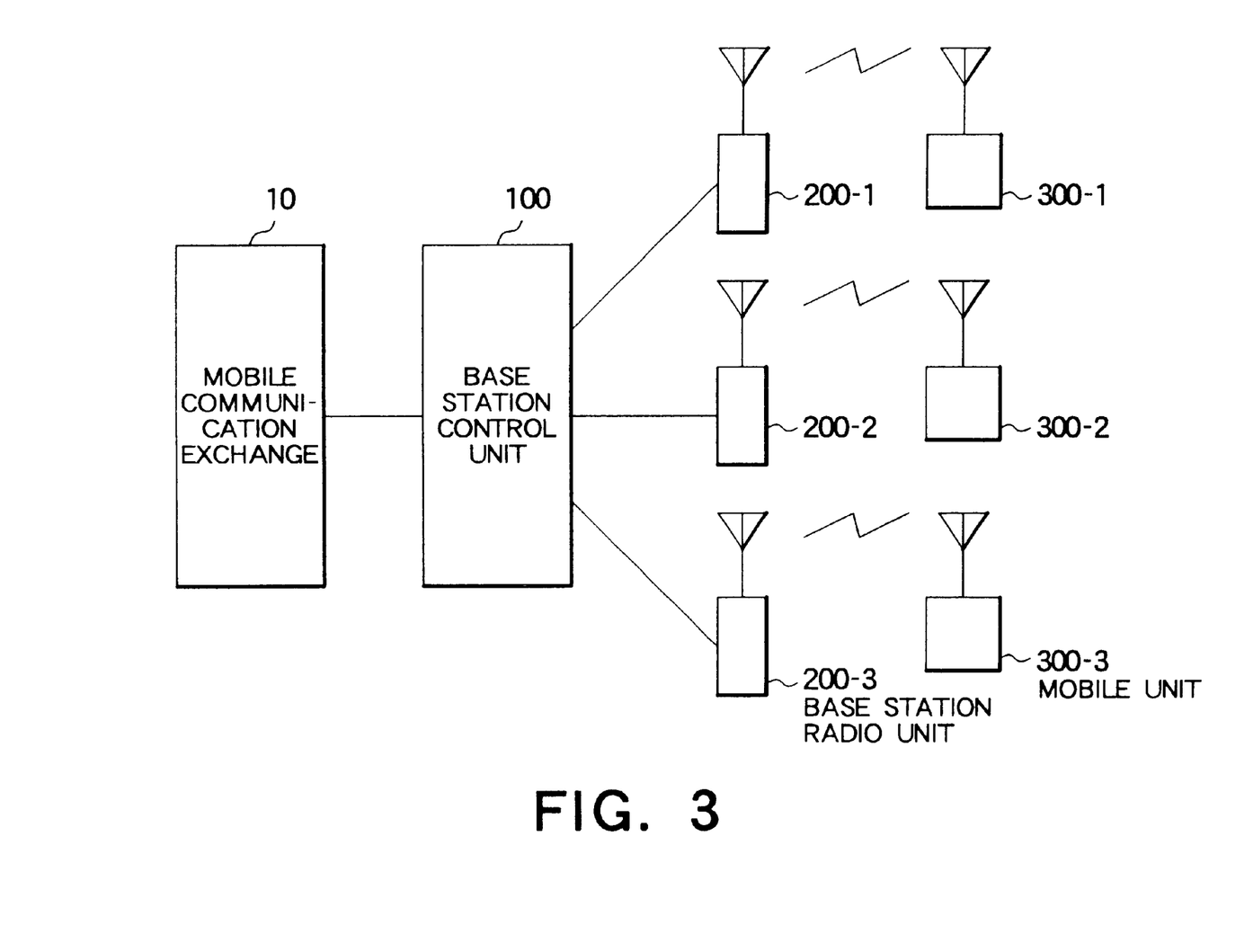
FIG. 3 is a block diagram showing the structure of a CDMA system using a frame offset setting arrangement or method according to this invention.

Referring to FIG. 3, a frame offset setting arrangement according to one embodiment of this invention will be described. In the figure, illustrated is a CDMA system in which the communication standard IS-95 is applied to a radio zone. The CDMA system comprises a plurality of base station radio units 200-1 through 200-3 each of which independently defines a communicable area, a plurality of mobile units 300-1 through 300-3 each of which is movable in the communicable area defined by each base station radio unit 200-i (i=1 through 3) and can communicate with other communication apparatus, a base station control unit 100 for controlling each base station radio unit 200-i, and a mobile communication exchange 10 for carrying out an exchanging operation with respect to mobile communication.

Figure 4:
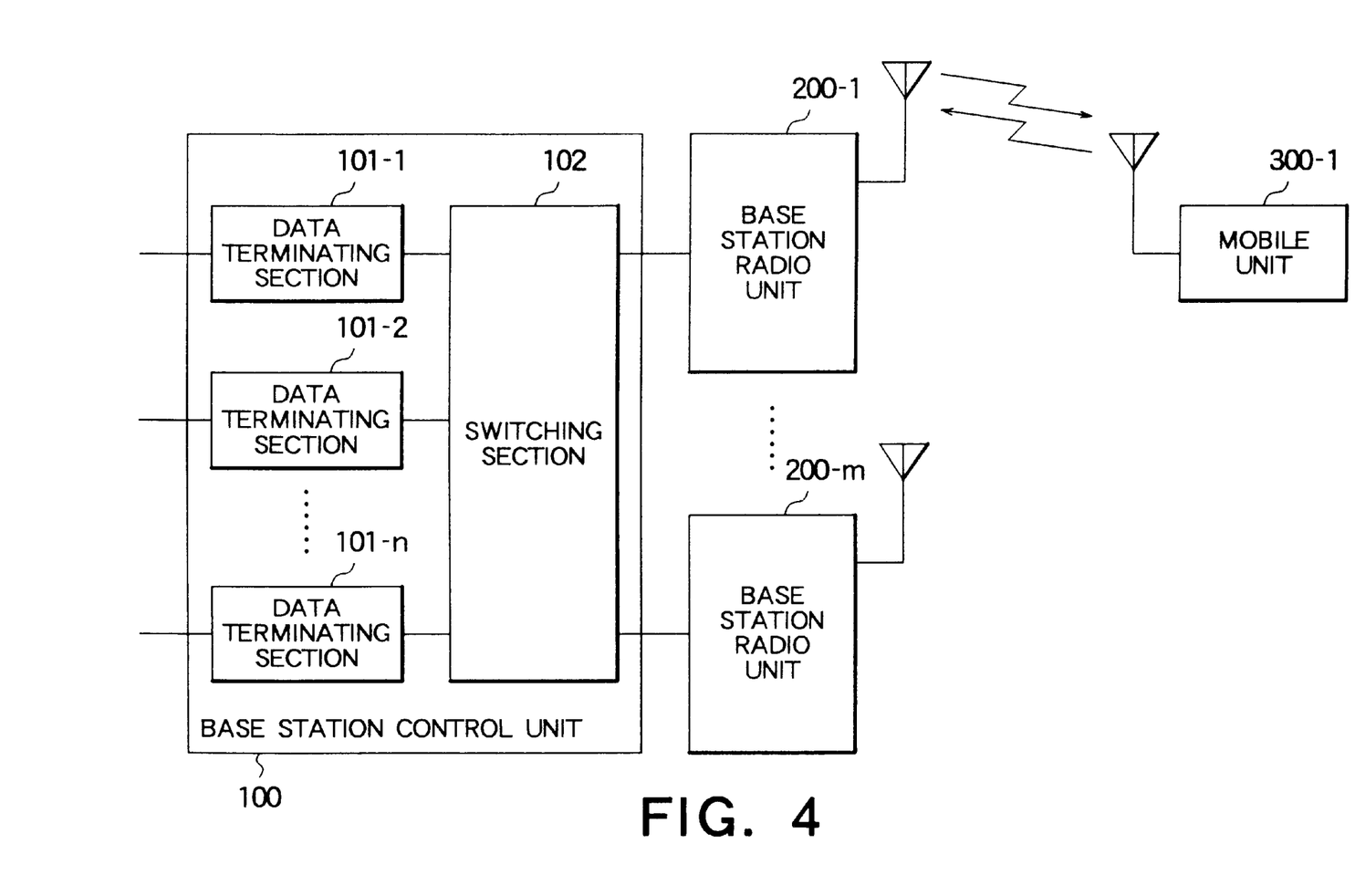
FIG. 4 is a block diagram showing the structure of a base station control unit illustrated in FIG. 1.

It is assumed here that the base station control unit 100 includes a QCELP/PCM converter. Specifically, as illustrated in FIG. 4, the base station control unit 100 comprises a plurality of data terminating sections 101-1 through 101-n (n being a positive integer) for carrying out QCELP/PCM conversion, and a switching section 102 for distributing outputs of the base station radio units 200-1 through 200-m (m being a positive integer) to the data terminating sections 101-1 through 101-n.

Figure 5:
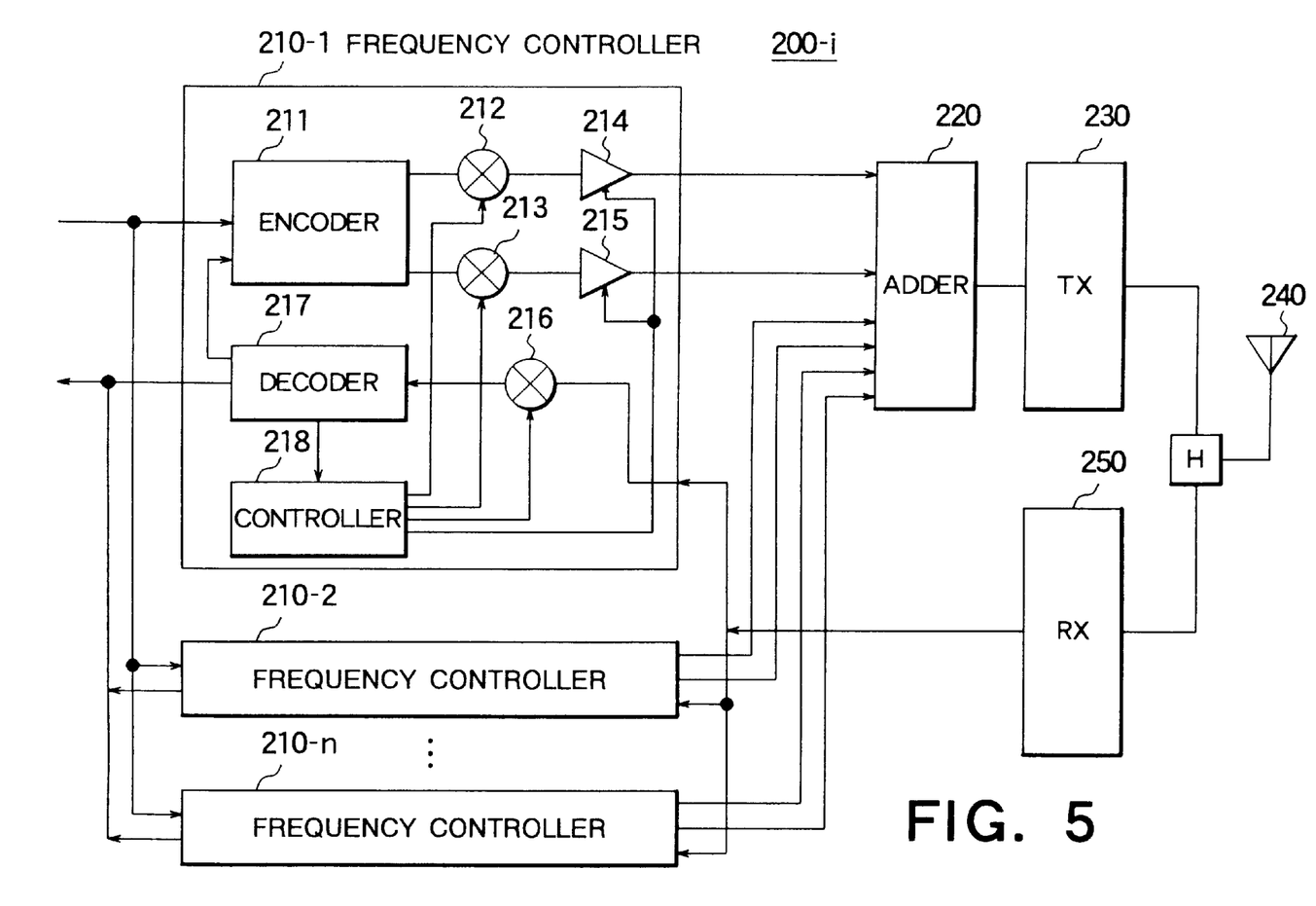
FIG. 5 is a block diagram showing the structure of a base station radio unit illustrated in FIG. 1.

Each base station radio unit 200-i has a structure illustrated in FIG. 5. Specifically, the base station radio unit comprises a plurality of frequency controllers 210-1 through 210-n, an adder 220 for adding output signals of the frequency controllers 210-1 through 210-n, a transmitter (TX) 230 for transmitting the result of addition through an antenna 240, and a receiver (RX) 250 for receiving a reception signal through the antenna 240. A coupler (H) is arranged between the antenna 240 and each of the transmitter 230 and the receiver 250.

Each frequency controller in the base station radio unit comprises an encoder 211 for encoding a signal to be transmitted, a decoder 217 for decoding the reception signal, and a controller 218 for controlling multipliers 212, 213, and 216 and buffers 214 and 215.

Turning back to FIG. 3, it is assumed, in the state illustrated in the figure, that the mobile units 300-1, 300-2, and 300-3 are located in the communicable areas defined by the base station radio units 200-1, 200-2, and 200-3, respectively, and that each mobile unit is communicating with each corresponding base station radio unit. Herein, frame offset values determined by the respective base station radio units are assigned. Let the frame offset values assigned to the mobile units 300-1, 300-2, and 300-3 be represented by "A", "B", and "C", respectively.

In the above-mentioned structure, consideration will at first be made about the case where the mobile unit 300-1 moves into the communicable area defined by the base station radio unit 200-2. In this event, an initial frame offset value before the movement is continuously set without being changed. Accordingly, there is a possibility that the frame offset value thus set is the same as the mobile unit 300-2 uses.

Likewise, if a large number of mobile units move into the communicable area defined by the base station radio unit 200-2, the possibility of setting the frame offset values close to one another to result in concentration in distribution of the frame offset values is increased. In this arrangement, the concentration of distribution of the frame offset values is detected and the frame offset values are reset.

Figure 6:
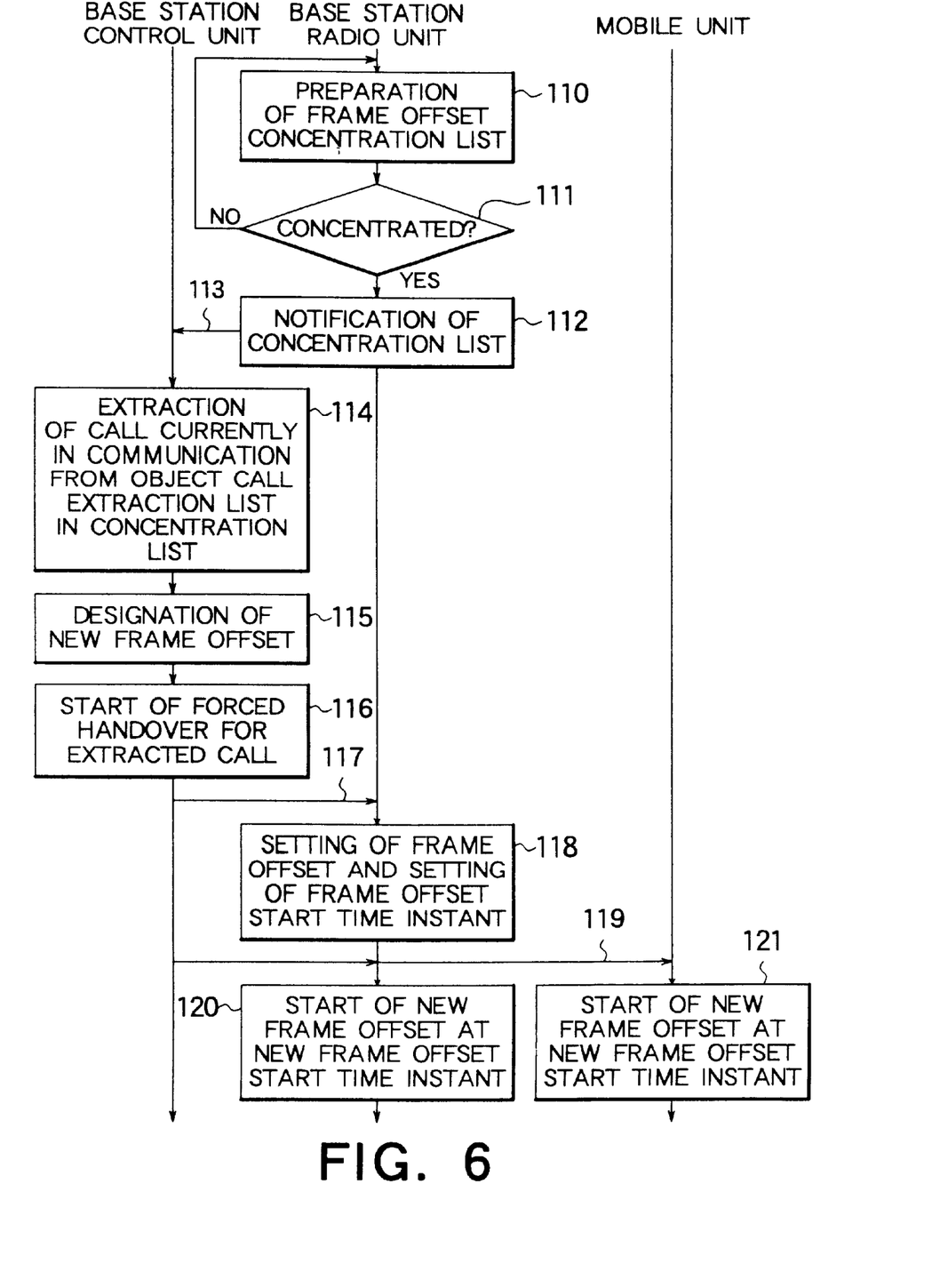
FIG. 6 is a flow chart for describing a frame offset setting operation by the frame offset setting method according to this invention.

Referring to FIG. 6, description will be made about operations of detecting the concentration in distribution of the frame offset values and resetting the frame offset values.

In the figure, each of the base station radio units monitors the concentration in distribution of the frame offset values (steps 110→111→110). In this case, the concentration in distribution of the frame offset values is monitored by preparing a concentration list which will later be described. The concentration list includes an object call extraction list, an old frame offset list, and a new frame offset list.

When a use counter for counting use of a common frame offset value exceeds a particular threshold value "X", it is judged that the distribution of the frame offset values is concentrated. A notice 113 including information of occurrence of the concentration in distribution of the frame offset values and the concentration list is delivered to the base station control unit (steps 111→112). Supplied with the notice 113 including the concentration list, the base station control unit extracts calls currently on communication from the object call extraction list contained in the concentration list (step 114). The new frame offset list is referred to and a new frame offset value is determined (step 115). For the extracted call, forced handover is started (step 116).

When the forced handover is started, a notice 117 including the new frame offset value and a start time instant of the new frame offset value is delivered to the base station radio unit. The notice 117 is called Mode Modify.

The base station radio unit sets the new frame offset value supplied thereto and the start time instant of the new frame offset value (step 118). A message requesting execution of the forced handover is delivered to the base station and the mobile unit together with a notice 119 including the new frame offset value and the start time instant of the new frame offset value. The notice 119 is called Handoff Direction Message.

The base station starts use of the new frame offset value at the start time instant supplied thereto (step 120). Likewise, the mobile unit starts use of the new frame offset value at the start time instant supplied thereto (step 121). By the above-mentioned operation, the concentration in distribution of the frame offset values is cancelled. The forced handover referred to herein is equivalent in meaning to switching of a channel used by the mobile unit.

Figure 7:
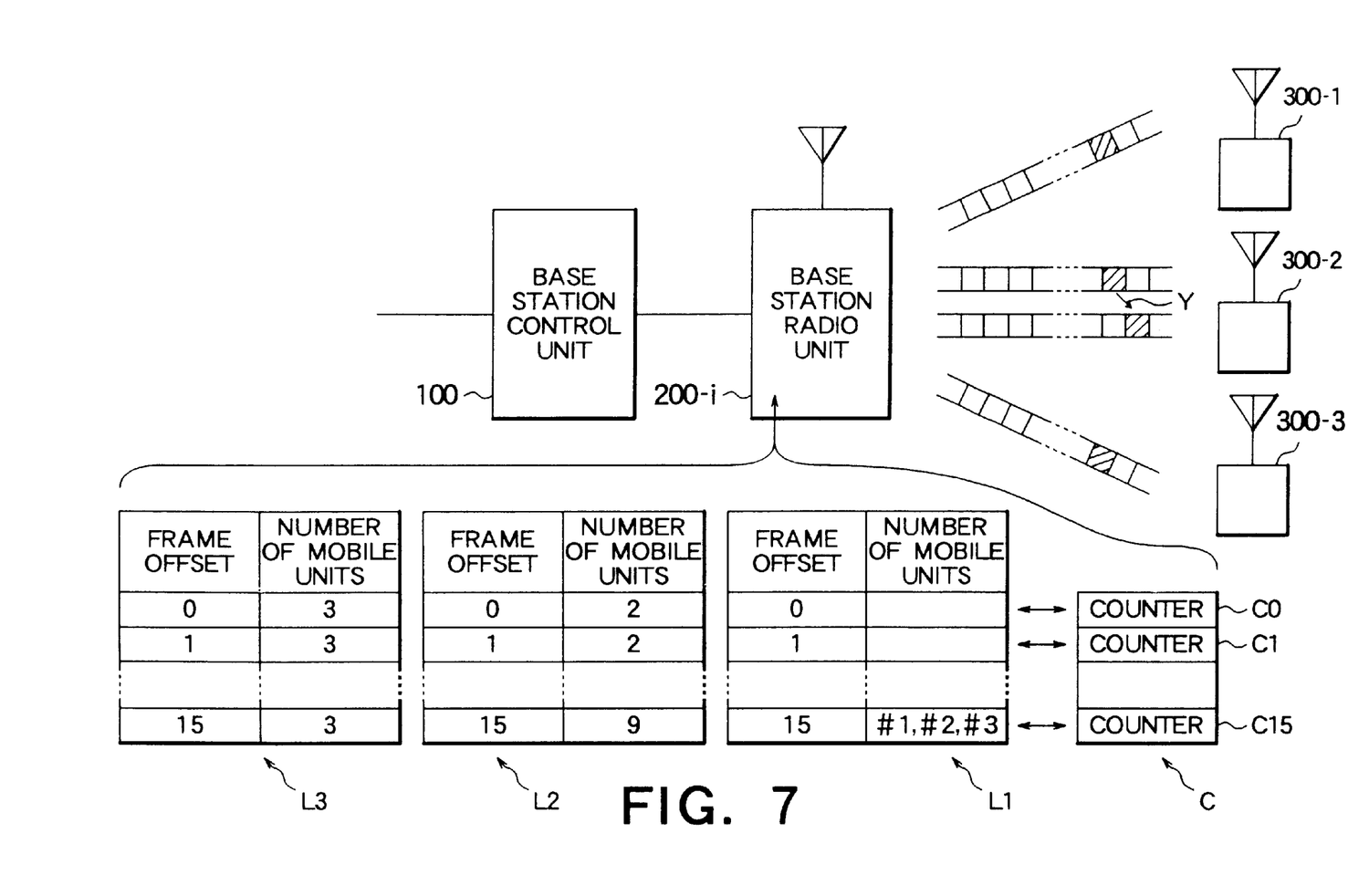
FIG. 7 is a view for describing the frame offset setting operation.

Further referring to FIG. 7, the above-mentioned operations will be described more in detail. As illustrated in the figure, each of the mobile units 300-1 through 300-3 delivers a signal (or a speech packet) to the base station radio unit 200-i on the basis of the frame offset value. The hatched portion in the figure represents the signal transmitted on the basis of the frame offset value.

The base station radio unit 200-i prepares the above-mentioned concentration list. In the concentration list, the object call extraction list L1 in the figure is a table of correspondence between each frame offset value and unit numbers of the mobile units which currently communicate by the use of the frame offset value. A use counter C is provided in the base station radio unit 200-i in correspondence to each offset value. Specifically, a plurality of counters C0 through C15 corresponding to the offset values "0" through "15", respectively, forms the use counter C.

Each of the counters C0 through C15 forming the use counter C counts the number of the mobile units which currently communicate by the use of the corresponding frame offset value. For example, it is assumed that unit numbers of the mobile units using the frame offset value "15" are #1, #2, and #3. In this event, these unit numbers are registered in an item corresponding to the frame offset value "15" in the object call extraction list L1. Therefore, the count of the counter C15 corresponding to the frame offset value "15" is equal to "3".

The old frame offset list L2 is a table of correspondence between each frame offset value and the number of the mobile units which currently communicate by the use of the frame offset value. The new frame offset list L3 is a table of correspondence between each frame offset value and the number of the mobile units to use the offset value after restart. By referring to these lists L2 and L3, it is possible to determine the frame offset value without causing the concentration in distribution.

In the figure, it is assumed that the number of the mobile units using the frame offset value "15" is increased and the count of the counter C15 corresponding to the frame offset value "15" reaches the threshold value of "9" (the above-mentioned threshold value X=9). In this event, the concentration list (the object call extraction list L1, the old frame offset list L2, and the new frame offset list L3) is delivered to the base station control unit 100. Supplied with the concentration list, the base station control unit 100 refers to these lists, determines the new frame offset value, and starts the forced handover.

When the forced handover is started, the notice including the new frame offset value and the start time instant of the frame offset value is delivered through the base station to each mobile unit. Each mobile station sets the new frame offset value supplied thereto and the start time instant of the new frame offset value and starts use of the new frame offset value at the start time instant. As a result of starting the new frame offset value in the mobile unit in the above-mentioned manner, the transmitting timing of the signal or the speech packet is varied as depicted by an arrow Y in the figure. As a result, the concentration in distribution of the frame offset values is cancelled.

In the old frame offset list L2 illustrated in the figure, the numbers of the mobile units using the frame offset values "0", "1", and "15" are equal to "2", "2", and "9", respectively. In this event, the concentration in distribution of the frame offset values occurs. If the forced handover is started in this distribution state, the numbers of the mobile units using the frame offset values "0", "1", and "15" are all equal to "3". Thus, the concentration in distribution is cancelled.

Specifically, the number of the mobile units using the frame offset value "15" reaches the threshold value of "9". Then, the unit numbers of the mobile units using the frame offset values "15" are extracted. For the mobile units thus extracted, the forced handover is started. By starting the forced handover, the frame offset values "0" and "1" used by a smaller number of the mobile units are used instead of "15". As a result, the concentration in distribution is cancelled.

If the numbers of the mobile units using the frame offset value "0" and "1" are large, use is made of another frame offset value (used by a smaller number of the mobile units). In this case, the frame offset value used by a smaller number of the mobile units can be selected by referring to the object call extraction list L1 or the old frame offset list L2.

In the old frame offset list L2, the frame offset values may be rearranged in an ascending (or a descending) order of the numbers of the mobile units using the values. Such rearrangement facilities selection of the new frame offset values.

Description will now be made about a method of setting the threshold value for judging the concentration in distribution of the frame offset values. At first, frame offsetting of IS-95 is prepared for levelized use of the transmission path between the base station control unit and the base station radio unit. For example, if all mobile units use a common frame offset value, all of transmission timings of speech signals or packets of every 20 ms transmitted from the traffic channel controller (TCHC) to the mobile units are coincident.

If the number of terminals simultaneously communicating is great, a transmission capacity of the transmission path between the base station control unit and the base station radio unit is exceeded. In this event, the signals from the TCHC are accumulated in the digital transmission interface (DTI) of the base station radio unit to cause signal delay which in turn results in speech delay. In view of the above, the 16 kinds of frame offset values "0" through "15" are uniformly assigned so that the speech signals transmitted from a plurality of the TCHCs are not simultaneously outputted from the DTI. It is noted here that the frame offsetting of IS-95 merely aims to cancel transmission delay and is not concerned with the radio zone at all.

The base station radio unit controls the frame offset values for every 2 MByte channels. Upon occurrence of a new call, a least used one of the frame offset values among the 16 kinds is assigned at that time. In other words, use is made of the LRU (Least Recently Used) method well known in the art. If the threshold value for simultaneously use is exceeded for a particular frame offset value as a result of handover, sector handover is started to switch the particular frame offset value into the least used frame offset value. From the transmission capacity of the 2 MByte channel, the threshold value for the number of calls simultaneously using a common offset value is equal to "9".

The reduction of the delay achieved by the base station radio unit in processing the signals (speech and various control signals) received with the common offset value depends upon processing ability of the base station radio unit. If the processing ability is high, no problem will arise even in case of multiple overlapping use. However, if the processing ability is low, the delay will occur in case of double or triple overlapping use. Therefore, the threshold value must be determined in dependence upon the processing ability of the base station radio unit.

As described above, the concentration in distribution of the frame offset values is monitored in the base station radio unit in the CDMA system and is informed to the base station control unit. Supplied with the information, the base station control unit performs the handover of the object call and determines the new frame offset values in response to the information. Thus, it is possible to correct the concentration in distribution of the frame offset values and to achieve uniform distribution of the frame offset values.

If a recording medium recording a program for achieving the operation described above in conjunction with FIG. 6 is prepared and a computer is controlled by the program recorded in the recording medium, it is possible to perform the frame offset setting operation in the manner similar to that mentioned above, as will readily be understood. The recording medium may comprise a semiconductor memory, a magnetic disk unit, or a desired one of various other recording mediums.

As described above, it is possible according to this invention to reduce the processing delay by resetting the frame offset values so that the concentration in distribution of the frame offset values in the base station is reduced. In other words, it is possible to construct the system in which the speech or the data delay hardly occurs.

What is claimed is:

1. A frame offset setting arrangement arranged in a base station of a code division multiple access system for setting frame offset values in mobile units by informing said frame offset values to said mobile units, said frame offset values representing amounts of offsetting, from a leading edge of each frame, transmission timings of speech packets when said mobile units transmit said speech packets to said bas station, respectively, said frame offset setting arrangement comprising:

concentration detecting means for detecting concentration in distribution of said frame offset values set in said mobile units; and leveling means for leveling, when said concentration detecting means detects said concentration, the frame offset values for the mobile units which are currently in communication.

2. A frame offset setting arrangement as claimed in claim 1, wherein said concentration detecting mass comprises:

counters corresponding to said frame offset values, each of said counters counting as a counted value the number of the mobile units assigned with the frame offset value corresponding to each of said counters; and detecting means for detecting said concentration by detecting that the counted value of at least one of said counters reaches a predetermined value.

3. A frame offset setting arrangement as claimed in claim 2, wherein said leveling means comprises:

a list indicative of the mobile units which are currently in communication; and resetting means for resetting, with reference to said list, into new frame offset values the frame offset values for the mobile units which are currently in communication.

4. A frame offset setting arrangement as claimed in claim 3, wherein said resetting means comprises:

producing means for producing said new frame offset values with reference to said list; and informing means for information said new frame offset values to the mobile units which are currently in communication.

5. A frame offset setting arrangement as claimed in claim 1, wherein said leveling means comprises:

a list indicative of the mobile units which are currently in communication; and resetting means for resetting, with reference to said list, into new frame offset values the frame offset values for the mobile units which are currently in communication.

6. A frame offset setting arrangement as claimed in claim 5, wherein said resetting means comprises:

producing means for producing said new frame offset values with reference to said list; and informing means for informing said new frame offset values to the mobile units which are currently in communication.

7. A frame offset setting method carried out in a base station of a code division multiple access system for setting frame offset values in mobile units by assigning one of a predetermined number of said frame offset values to each of said mobile units, said frame offset values representing amounts of offsetting, from a leading edge of a frame, transmission timings of speech packets when said mobile units transmit said speech packets to said base station, respectively, said frame offset setting method comprising:

counting a number of mobile units assigned to each of the predetermined number of frame offset values;

detecting concentration in distribution of said frame offset values by detecting when the counted number of mobile units assigned to one of said frame offset values reaches a predetermined value; and leveling, when said concentration detecting step detects said concentration, the frame offset values assigned to at least two of the mobile units which are currently in communication with the base station while maintaining the predetermined number of frame offset values.

8. A frame offset setting method as claimed in claim 7, wherein said detecting step comprises:
preparing counters corresponding to said frame offset values, each of said counters counting as a counted value the number of the mobile units assigned with the frame offset value corresponding to each of said counters; and
detecting said concentration by detecting that the counted value of at least one of said counters reaches a predetermined value.

9. A frame offset setting method as claimed in claim 8, wherein said leveling step comprises:
preparing a list of the mobile units which are currently in communication with the base station; and
resetting, with reference to said list, the frame offset values for at least two of the mobile units which are currently in communication with the base station by assigning new frame offset values to the at least two of the mobile units from the predetermined number of frame offset values.

10. A frame offset setting method as claimed in claim 9, wherein said resetting step comprises:
producing said new frame offset values with reference to said list; and
assigning said new frame offset values to the at least two of the mobile units which are currently in communication with the base station.

11. A frame offset setting method as claimed in claim 7, wherein said leveling step comprises:
preparing a list of the mobile units which are currently in communication with the base station; and
resetting, with reference to said list, the frame offset values for at least two of the mobile units which are currently in communication with the base station by assigning new frame offset values to the at least two of the mobile units from the predetermined number of frame offset values.

12. A frame offset setting method as claimed in claim 11, wherein said resetting step comprises:
producing said new frame offset values with reference to said list; and
assigning said new frame offset values to the at least two of the mobile units which are currently in communication with the base station.

13. A frame offset setting device employed in a base station of a code division multiple access system for setting frame offset values in mobile units by assigning one of a predetermined number of said frame offset values to each of said mobile units, said frame offset values representing amounts of offsetting, from a leading edge of a frame, transmission timings of speech packets when said mobile units transmit said speech packets to said base station, respectively, said frame offset setting device comprising:
a concentration detecting section that detects concentration in distribution of said frame offset values set in said mobile units; and
a leveling section that levels, when said concentration detecting section detects said concentration, the frame offset values assigned to at least two of the mobile units which are currently in communication with the base station while maintaining the predetermined number of frame offset values.

14. The frame offset setting device as claimed in claim 13, wherein said concentration detecting section comprises:
a memory storing a plurality of counters corresponding to said frame offset values, each of said counters counting as a counted value the number of the mobile values assigned with the frame offset value corresponding to each of said counters; and
a detecting portion that detects said concentration by detecting that the counted value of at least one of said counters reaches a predetermined value.

15. The frame offset setting device as claimed in claim 14, wherein said leveling section comprises:
a memory storing a list of the mobile units which are currently in communication with the base station; and
a resetting section that resets, with reference to said list, the frame offset values assigned to the at least two of the mobile units which are currently in communication with the base station by assigning new frame offset values to the at least two of the mobile units from the predetermined number of frame offset values.

16. The frame offset setting device as claimed in claim 15, wherein said resetting section comprises:
a producing section that produces said new frame offset values with reference to said list; and
an assigning section that assigns said new frame offset values to the at least two of the mobile units which are currently in communication with the base station.

17. The frame offset setting device as claimed in claim 13, wherein said leveling section comprises:
a memory storing a list indicative of the mobile units which are currently in communication with the base station; and
a resetting section that resets, with reference to said list, the frame offset values assigned to at least two of the mobile units which are currently in communication with the base station to new frame offset values.

18. The frame offset setting device as claimed in claim 17, wherein said resetting section comprises:
a producing section that produces said new frame offset values with reference to said list; and
an assigning section that assigns said new frame offset values to the at least two of the mobile units which are currently in communication with the base station.

19. A frame offset setting method carried out in a base station of a code division multiple access system for setting frame offset values in mobile units by assigning one of a predetermined number of said frame offset values to each of said mobile units, said frame offset values representing amounts of offsetting, from a leading edge of a frame, transmission timings of speech packets when said mobile units transmit said speech packets to said base station, respectively, said frame offset setting method comprising:
counting a number of mobile units assigned to each of the predetermined number of frames offset values;
detecting when the counted number of mobile units assigned to one of said frame offset values reaches a predetermined value; and
reassigning, when said predetermined value is reached, at least two of the mobile units which are currently in communication with the base station to new frame offset values among the predetermined number of frame offset values.

20. A frame offset setting method as claimed in claim 19, wherein when said predetermined value is reached, all of the mobile units which are currently in communication with the base station are reassigned to new frame offset values among the predetermined number of frame offset values.

21. A frame offset setting method as claimed in claim 7, wherein when said concentration detecting step detects said concentration, the frame offset values assigned to all of the mobile units which are currently in communication with the base station are leveled, while maintaining the predetermined number of frame offset values.

22. The frame offset setting device as claimed in claim 13, wherein when said concentration detecting section detects said concentration, the frame offset values assigned to all of the mobile units which are currently in communication with the base station are leveled, while maintaining the predetermined number of frame offset values.

* * * * *